(No Model.) 2 Sheets—Sheet 2.

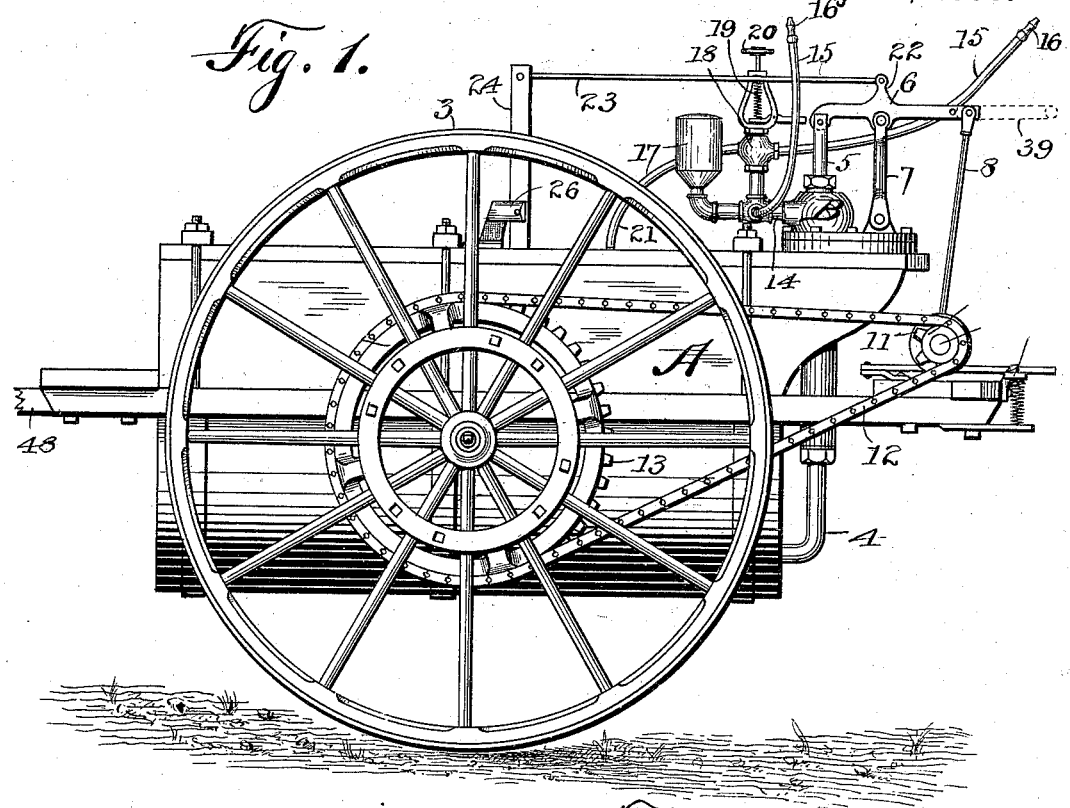

G. A. MYERS.
SPRAYING MACHINE.

No. 542,712. Patented July 16, 1895.

WITNESSES:
H. A. Carhart.
C. B. Kime

INVENTOR
George A. Myers
by Paul _____
ATTORNEYS.

UNITED STATES PATENT OFFICE.

GEORGE A. MYERS, OF PORT BYRON, NEW YORK, ASSIGNOR TO THEODORE B. MYERS, OF ST. PAUL, MINNESOTA.

SPRAYING-MACHINE.

SPECIFICATION forming part of Letters Patent No. 542,712, dated July 16, 1895.

Application filed January 13, 1893. Serial No. 458,230. (No model.)

*To all whom it may concern:*

Be it known that I, GEORGE A. MYERS, of Port Byron, in the county of Cayuga, in the State of New York, have invented certain new and useful Improvements in Spraying-Machines, of which the following is a specification.

My invention relates to improvements in automatic spraying-machines designed for use in orchards and vineyards, its object being to provide means for automatically agitating the liquid or fluid to be discharged, so as to prevent the solid matter mixed with it from settling to the bottom of the tank, and also means for regulating and directing the discharge of the fluid from the pump, according to the character of the trees or plants which are to be treated.

To this end my invention consists in providing a semicylindrical tank supported centrally upon the axle of a two-wheeled vehicle and in connecting therewith a force-pump so geared to one of the driving-wheels that it is automatically operated by the movement of the vehicle, and in arranging in the tank an agitator so connected to the operating parts of the pump that it is automatically kept in action whenever the pump is in operation. I also in some cases connect therewith a system of spraying-nozzles, which may be adjusted to vary the direction of the spray therefrom as desired. The pressure or amount of the discharge is governed by an adjustable pressure-valve at the pump, and a connected air-pressure chamber maintains uniformity of flow. The automatically-actuating mechanism for the pump may be readily detached therefrom and a handle connected therewith, so that it may be worked by hand while the vehicle remains stationary.

My invention further consists in the construction and combination hereinafter particularly described, and pointed out in the claims.

Figure 4:
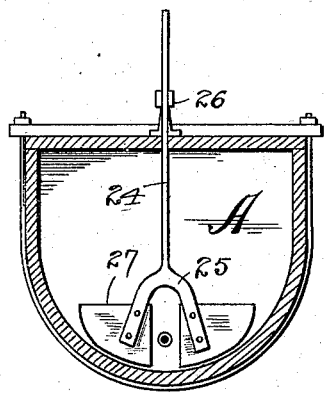
Figure 5:
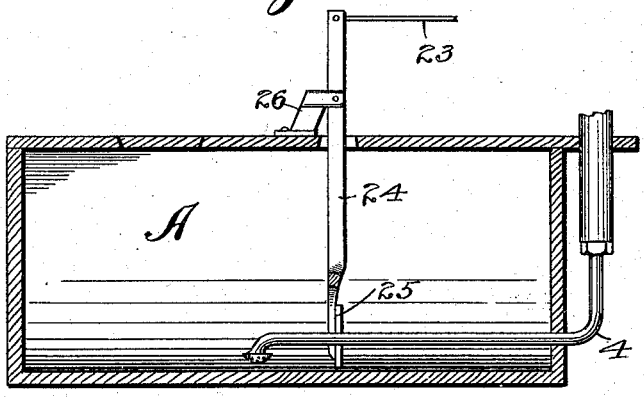
Figure 3:
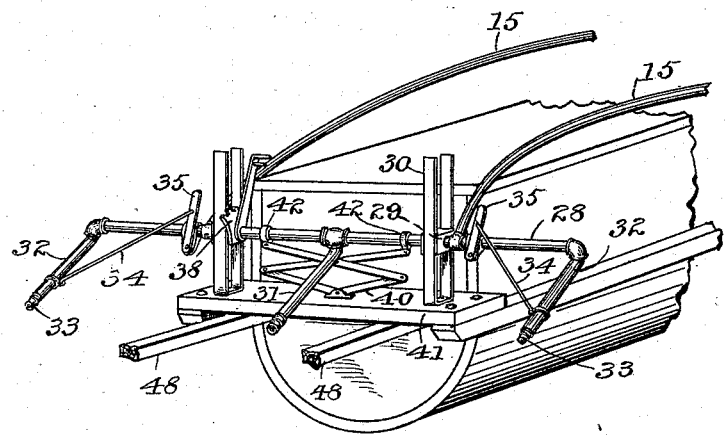
Figure 6:
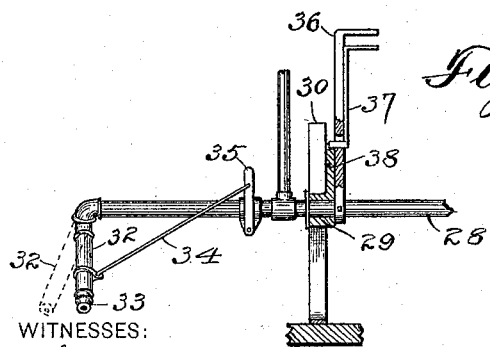

In the accompanying drawings, forming part of this specification, Figure 1 is a side elevation of the apparatus, showing the tank, the pump, its connecting-pipes, and means for automatically operating the pump from the driving-wheel and for operating the agitator from the pump. Fig. 2 is a top plan view. Fig. 3 is a perspective detail of a modified construction having a system of adjustable spraying devices for the purpose of treating low-growing plants. Fig. 4 is a detail cross-section of the tank, showing the agitator. Fig. 5 is a central vertical longitudinal section of the tank, showing the agitator, the eduction-pipe, and the rod connecting the agitator with the pump; and Fig. 6 is a detail of one of the spraying-nozzles, showing the means for adjusting its position.

In the drawings, A represents a semicylindrical tank supported upon the transverse axle 2, on which turn the carrying-wheels 3, the vehicle being drawn by the shafts 48. Mounted upon the wheels is the pump B, connected by means of the pipe 4 with the interior of the tank near its bottom and center. The pump-piston 5 is operated by the walking-beam 6 supported upon the rocking standard 7. To the other end of the walking-beam is detachably pivoted the connecting-rod 8, the other end of which is pivoted to the crank 9 upon the shaft 10. This shaft is operated by means of the sprocket-wheel 11, to which is geared a sprocket-chain 12, driven by means of the sprocket 13 fixed to one of the driving-wheels of the vehicle. To the eduction-pipe 14 are connected the hose-pipes 15, provided with suitable spraying-nozzles 16.

17 is an air-pressure chamber of ordinary construction connected with the eduction-pipe, and 18 is a pressure-regulating valve of ordinary type controlled by the spring 19, the tension of which is adjusted by the hand-wheel 20 to determine the amount of pressure, an overflow-pipe 21 connecting the valve-chamber with the tank. A rocker-arm 22 projects upward from the walking-beam 6, and to it is pivoted the connecting-rod 23, the other end of which is pivoted to the upright arm 24 of the agitator 25, the arm 24 being pivotally supported upon the standard 26. The agitator is bifurcated, having two paddles or wings 27 arranged on opposite sides of the suction-pipe 4 for the more complete stirring of the liquid close to the pipe and its inlet.

In the modified construction shown in Fig. 3 the hose-pipes 15, instead of being provided with nozzles, are connected to a transverse pipe 28 turning in the blocks 29, which are vertically slidable in guides 30, the pipe being supported in adjusted positions by means of the lazy-tongs 40, which are supported on the foot-board 41 and are connected to the collars 42, slidably adjustable on the pipe 28. To the pipe 28 are connected the branch pipes 31 and 32, each being provided with nozzles 33. The end branch pipes 32 are pivotally coupled to the pipe 28, and are adjustable laterally by means of the rods 34 connected to the pivoted lever 35, the pipes being turned outward or inward by the throw of the lever to determine the width of the spray, as indicated by the dotted lines in Fig. 6. The vertical angular position of the branch pipes 31 and 32 is determined by rocking the pipe 28 in its bearings by means of the handle 36 connected rigidly to the pipe, and having a catch 37 adapted to engage the notches or teeth of the quadrant 38. As the vehicle is moved the pump is automatically operated and the agitator kept in motion to prevent the settling of the solid matter in the tank. The air-pressure chamber maintains uniformity of flow, and the pressure-valve is adjusted to give the required force or pressure to the flow of the liquid from the pump, the surplus being carried back into the tank by the overflow-pipe. By adjusting the elevation and angles of the spraying-pipes the liquid may be sprayed over low-growing plants, such as potato-vines, and the pipes adjusted so as to deliver any width of spray. With the construction shown in Figs. 1 and 2, the hose-pipe 15 may be actuated by hand to throw a spray upon trees or vines alongside the path of the vehicle.

In some cases it is desirable to operate the device when the vehicle is stationary. In such cases the connecting-rod 8 is disconnected from the walking-beam 6 and a handle 39 secured in its stead to the walking-beam, by means of which the pump may be operated by hand. The pump may also be disconnected from the driving mechanism when desired by throwing the clutch 44 out of gear with the shaft by means of the lever 45 held by the spring-controlled notched bar 46, as shown.

I claim—

1. In an apparatus of the class described, the combination of the transverse pipe connected to the source of supply and provided with lateral spray pipes, the vertical guides for said transverse pipe and means for adjusting its position in said guides.

2. In an apparatus of the class described, the combination of the transverse pipe connected with the source of liquid supply, the lateral spray pipes connected to said transverse pipe and having a swinging lateral adjustment, the vertical guides for said transverse pipe and means for supporting said pipe in adjusted positions in said guides.

3. In an apparatus of the class described, the combination of the transverse pipe connected with the source of liquid supply, the vertical guides, the bearing blocks for said pipe slidable in said guides, means for turning said pipe and holding it in adjusted angular positions in said bearings, means for supporting said pipe in vertically adjusted positions in said guides and the spraying devices carried by said pipe.

4. In an apparatus of the class described, the spraying devices comprising in combination, the vertically adjustable, rocking transverse pipe, and the branch or spray pipes connected therewith.

5. In an apparatus of the class described, the combination with the pump, of the vertically adjustable transverse pipe connected therewith, the branch spray pipes connected with said transverse pipe, means for laterally adjusting the direction of said branch pipes, and means for rocking said transverse pipe to vertically adjust the direction of said branch pipes.

6. In an apparatus of the class described, the spraying devices therefor, comprising in combination the transverse pipe, its branch spray pipes, means for laterally and vertically adjusting the direction of said branch pipes, the vertical guides for said transverse pipe, and the means for adjusting its position and supporting it in said guides.

7. In an apparatus of the class described, the combination of the transverse pipe, its branch pipes having pivotal connection therewith, the levers and rods for adjusting the lateral direction of said branch pipes, the vertically slidable bearings for said transverse pipe, and its rocking lever, and adjustable lazy-tong support.

8. The combination with the tank, and the outlet pipe arranged along its bottom, of the cleft or bifurcated paddle arranged over said pipe, substantially as described.

9. The combination of the tank, the outlet pipe along its bottom, the bifurcated paddle arranged with one wing on each side of the pipe, and means for automatically actuating it as the liquid is drawn out through the pipe, substantially as described.

10. The combination of the tank, the eduction pipe arranged longitudinally of the same and near its bottom, the bifurcated paddle straddling said pipe and having pivotal support above said tank, and means for operating said paddle from the pump devices.

In testimony whereof I have hereunto set my hand this 2d day of January, 1893.

GEORGE A. MYERS.

In presence of—
C. R. BERRY,
BERT SMITH.